Jan. 1, 1963
G. R. JAMES
3,071,453
HYDROCARBON REFORM PROCESS
Filed Jan. 12, 1960
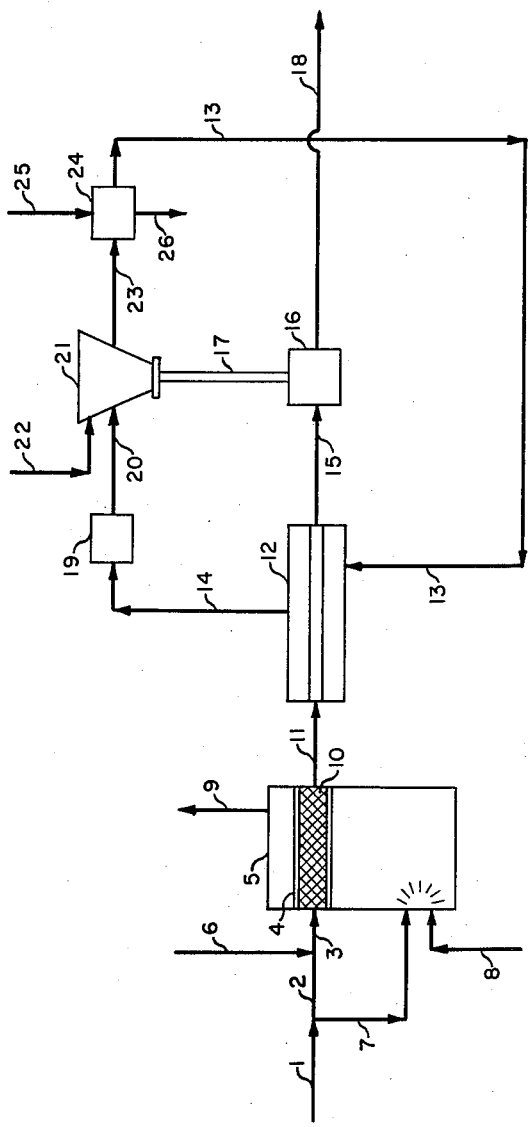
GEORGE RUSSELL JAMES
INVENTOR.
BY J. T. Chaboty
AGENT United States Patent Office 3,071,453
Patented Jan. 1, 1963

3,071,453
HYDROCARBON REFORM PROCESS
George Russell James, Armonk, N.Y., assignor to Chemical Construction Corporation, New York, N.Y., a corporation of Delaware
Filed Jan. 12, 1960, Ser. No. 2,004
2 Claims. (Cl. 48—196)

This invention relates to a process of catalytic hydrocarbon reform, in which a hydrocarbon stream is reacted with steam at elevated temperature to produce a gas stream known as synthesis gas which is subsequently utilized in various processes. In the present invention the heat content of the synthesis gas is utilized to provide power to compress the gas prior to usage in high pressure processes such as ammonia or methanol synthesis.

The reforming of hydrocarbons is a well-known procedure, in which a hydrocarbon raw material is reacted with steam to produce a mixed carbon monoxide-hydrogen gas stream. Probably the hydrocarbon raw material most commonly used in this process is methane, which is the principal constituent of natural gas and is a major constituent of other gaseous hydrocarbon streams such as refinery off-gases. Of course, other hydrocarbon gases or liquids are also reformed in this manner. The conventional process comprises mixing the gaseous hydrocarbon stream with steam, and passing the mixed gas stream through the catalyst tubes of an externally-fired reformer unit. Under the elevated temperature condition and in the presence of the catalytic material, the hydrocarbon will react with the steam to yield a mixed carbon monoxide-hydrogen reformed gas stream.

In the case of ammonia synthesis, the reformed gas stream is further catalytically converted in a carbon monoxide oxidation unit, usually with the addition of further steam. In this process the carbon monoxide reacts with water vapor to yield further hydrogen and also carbon dioxide. The carbon dioxide is then removed, usually by scrubbing with aqueous potassium carbonate or monoethanolamine solution. The residual gas stream, consisting principally of hydrogen, is then thoroughly purified by known procedures and mixed with nitrogen. The mixed gas stream is thereafter compressed to ammonia synthesis pressure which is usually above 4000 p.s.i.g. and passed to the ammonia synthesis unit.

Another commercial usage for reformed gas is in methanol synthesis. Here the carbon monoxide content of the reformer gas may be only partially converted to carbon dioxide and hydrogen, with subsequent carbon dioxide removal. In methanol synthesis the feed gas to the methanol converter should have a hydrogen to carbon monoxide mol ratio of 2:1, hence in some cases the CO-oxidation step will not be required. The methanol converter feed gas is compressed to about 5200 p.s.i.g. prior to catalytic conversion to methanol.

Among other reformer gas utilizations which require preliminary gas procesing similar to the ammonia procedure, may be mentioned catalytic hydrogenations such as are practiced in the petroleum and vegetable oils refining industries. These processes are also usually carried out at an elevated pressure.

In these various processes the final gas stream is cooled prior to compression since this is required for thermodynamic efficiency in the compression step. The excess heat is usually removed by means of a heat exchanger utilizing cooling water which is usually subsequently passed to a cooling tower and recirculated to the heat exchanger. Thus the undesirable heat content of the gas stream has been wasted, since this heat is available at a relatively low level which has heretofore precluded utilization except in gas-to-gas heat exchangers within the process itself as described in U.S. Patent No. 2,487,981.

In the present invention, the hot reformer gas is cooled in a boiler or other means whereby the heat which is removed from the gas serves to generate steam at a relatively low pressure. The cooled gas, after various purification steps as indicated above, is then compressed by mechanical means. The previously generated steam is utilized in a steam turbine which serves to drive the gas compression unit which in turn is used to compress the gas. This improved process results in higher thermal efficiency and complete utilization of energy which had heretofore been wasted.

An object of the present invention is to produce a gas stream containing hydrogen at elevated pressure from hydrocarbon raw material in a more efficient manner.

Another object of this invention is to more completely utilize the thermal energy available in hot reformer gas.

A further object of this invention is to compress a synthesis gas derived from hydrocarbon reforming without consuming power derived from external sources for the compression.

An additional object of this invention is to provide a novel combination process for producing hydrogen-containing gas at elevated pressure with reduced energy requirements.

These and other objects of the present invention will become apparent from the description which follows. Referring to the FIGURE, which represents a preferred embodiment of the present invention, stream 1 is an input natural gas stream, principally methane. A portion of stream 1 is utilized for the reforming process, and passes via lines 2 and 3 into catalyst tube 4 of reformer 5. Stream 3 consists of natural gas mixed with the proper proportion of steam, admitted via 6. A portion of stream 1 may be utilized via line 7 for the external firing in reformer 5. In this case stream 7 is burned with air admitted via 8 to provide the heat and proper temperature level for the reforming reaction within tube 4. Usually a temperature of 1000° F.–1800° F. is required in unit 5 to produce the required reform temperature of 600° F. to 1500° F. within tube 4. It should be recognized that stream 7 is optional, other combustible gas streams or thermal sources may be employed for external firing in reformer 5. Flue gases derived from the combustion of stream 7 pass to a stack via 9.

Catalyst layer or bed 10 is provided within tube 4 of reformer 5. As the mixed stream 3 containing steam and hydrocarbon such as methane passes through tube 4, a catalytic reaction takes place between the methane or other hydrocarbon and stream resulting in the formation of carbon monoxide and hydrogen. The resulting product gas stream 11 leaves reformer 5 at an elevated temperature, usually about 800° F. to 1000° F. and is cooled in steam generation means 12. Unit 12 is preferably a steam boiler, with condensate water passed in via 13 and generated steam leaving via 14. Unit 12 is preferably operated so as to maintain a steam pressure between 25 p.s.i.g. and 100 p.s.i.g. in line 14, since this produces optimum heat recovery from line 11. A conventional waste heat boiler, not shown, may be used to partially cool stream 11 and recover high pressure steam prior to passing stream 11 through unit 12.

The cooled product gas stream leaves unit 12 via 15 and may be further cooled prior to compression in a conventional heat exchanger unit, not shown. Stream 15 is then compressed to proper elevated pressure in compression means 16. Unit 16 is a suitable centrifugal or reciprocating gas compressor, powered by shaft 17. The product gas stream, now at elevated pressure, is passed to synthesis gas utilization via 18. As previously decribed, line 18 may transmit the gas to a variety of processes among which may be mentioned methanol synthesis and petroleum refining.

Returning to steam boiler 12, the generated steam, line 14, passes first through optional heater unit 19 which may serve to super-heat the steam. The steam in any case now passes via line 20 through steam turbine 21. Depending on operating variables, it may be desirable to pass additional steam from other sources through turbine 21 via line 22. However, it is rarely necessary to furnish more than about 10% of total power requirement in this manner. The steam feed from lines 20 and 22 drives turbine 21 which in turn transmits power through shaft 17 into gas compressor 16. The exhaust steam leaves turbine 21 via 23 and is condensed in cooler 24 and recycled via 13 as liquid condensate water. Cooler 24 uses cooling water admitted via 25 and exiting via 26 to condense exhaust steam in line 23.

In a modification of the present invention, a portion or all of the carbon monoxide in the hot reformer exit gas stream 11 may be catalytically reacted with water vapor to provide further hydrogen and carbon dioxide in a shift converter, not shown. A unit of this type is described in U.S. patent application No. 760,187, filed September 10, 1958. This procedure would be used when the final gas stream is to be principally hydrogen, as in ammonia synthesis and catalytic organic hydrogenations. In this case the cooled gas stream 15 following unit 12 would first be treated to remove carbon dioxide as in a scrubbing tower, not shown, prior to compression. A partial carbon monoxide conversion to provide the proper carbon monoxide-hydrogen ratio might also be provided in the case of product gas usage for methanol synthesis.

Industrial applications of the present invention will now be described.

Example I

A stream of natural gas was utilized to produce a high pressure reformed gas product. The natural gas consisted mostly of methane, and in the following description all flow quantities are per 100 mols methane reformed. Thus per 100 mols methane reformed, 167 mols of natural gas were consumed. The natural gas was obtained at 275 p.s.i.g., and was first scrubbed with monoethanolamine (MEA) solution, which removed 6.7 mols of hydrogen sulfide from the gas stream.

The purified gas stream was then split, with 100 mols passing to catalytic reform together with 560 mols of steam derived from waste heat boilers at 275 p.s.i.g. The balance of the natural gas was used for heating purposes, mainly for external firing of the reformer furnace and preheating of the natural gas prior to reform. The reformed gas stream was produced at 1400° F. and 240 p.s.i.g., and was first cooled to 712° F. in a waste heat boiler. The generated steam was utilized as a portion of the steam added to further incoming natural gas prior to reform. The balance of this steam was obtained from a second waste heat boiler, which obtained heat from the reformer furnace flue gases.

The partially cooled reformed gas stream was now further cooled to 267° F. in two stages of low pressure steam generation. The first stage produced 3800 pounds of steam at 70 p.s.i.g. and cooled the gas stream to 341° F. at 235 p.s.i.g., while the second stage produced 3350 pounds of steam at 15 p.s.i.g. while cooling the gas to 267° F. at 232 p.s.i.g. The gas stream was then utilized as a heat source in the reboiler of the MEA regenerator and for boiler feed water preheat, and was finally cooled to 100° F. at 220 p.s.i.g. using a conventional gas cooler.

The cooled gas was then compressed to 600 p.s.i.g. in a centrifugal compression system. The centrifugal compressor was driven by a steam turbine which utilized the 70 p.s.i.g. and 15 p.s.i.g. steam previously generated for motive power. After expansion in the steam turbine, the exhaust steam was condensed to liquid water condensate at 150° F. and recycled.

Example II

Ammonia synthesis gas was produced by reforming natural gas, with compression prior to catalytic ammonia synthesis being accomplished in accordance with the teachings of the present invention. In order to minimize compression requirements, reforming of the natural gas was carried out at relatively high pressure.

Natural gas input to reforming was 1450 mols/hour, with steam added to provide a mixed stream with a 5.6:1 ratio of steam to natural gas. The mixed stream was heated to 500° F. by heat exchange with hot product ammonia synthesis gas, and then to 750° F. by heat exchange with hot reformed gas in CO-oxidation interbed cooler. Gas stream pressure was 600 p.s.i.g. The mixed stream then passed to primary catalytic reform, which took place in externally-fired reform tubes. The partially reformed gas was essentially completely converted in a secondary reform step, during which 1900 mols/hour of air was added to the gas stream.

The fully reformed gas stream was cooled from a secondary reform exit temperature of 1450° F. to 800° F. in a waste heat boiler. Product steam from this boiler, together with steam derived from a flue gas waste heat boiler which utilized the primary reformer flue gases as a heat source, comprised the reform steam which was mixed with incoming natural gas. The reformed gas stream, now consisting mostly of hydrogen, nitrogen, carbon monoxide, carbon dioxide and water vapor, was then passed through a two-bed catalytic CO oxidation unit, in which interbed cooling of the gas stream from 825° F. to 575° F. was carried out by the aforementioned heat exchange with the incoming mixed stream of natural gas and steam. The product gas stream, consisting mainly of hydrogen, nitrogen and carbon dioxide, was also cooled from 580° F. to 400° F. by heat exchange with the incoming mixed stream of natural gas and steam.

The gas stream, now at 530 p.s.i.g., was completely cooled from 400° F. to 230° F. in three stages using waste heat boilers, with final steam generation at 15 p.s.i.g. The steam generated in this manner was superheated and expanded in a steam turbine drive which powered the ammonia synthesis gas compressor. Only 10% of the total energy was derived from the superheat step, in other words, 90% of the energy requirement for compression was derived from the heat recovered from the gas stream in the form of low-pressure steam.

The fully cooled gas stream was scrubbed free of carbon dioxide in a conventional hot potassium carbonate scrubbing system, and final purification by copper liquor scrub yielded a product ammonia synthesis gas consisting of nitrogen and hydrogen at 500 p.s.i.g. with 0.2% argon and 1.0% methane inert impurities. This gas stream was compressed to 5200 p.s.i.g. in the aforementioned ammonia synthesis gas compressor, and passed to catalytic ammonia synthesis.

The above descriptions of specific embodiments should not be construed to limit the scope of the teaching of the present invention, since other modifications within the scope of the present invention will occur to those skilled in the art.

I claim:

1. Process for generating a high pressure synthesis gas stream containing hydrogen which comprises catalytically reacting methane with steam at a temperature between 600° F. to 1500° F. to produce a reformed gas stream principally comprising carbon monoxide and hydrogen, partially cooling said reformed gas stream to a lower temperature above 350° F. by heat exchange with water whereby high pressure process steam is produced, further cooling said reformed gas stream by heat exchange with water whereby low pressure steam is produced at a pressure between 25 p.s.i.g. to 100 p.s.i.g., compressing said cooled gaseous stream in mechanical compression means, and expanding said low pressure steam through power producing means connected to said compression means, whereby said low pressure steam provides at least a portion of the power requirement of said compression means.

2. Process of claim 1, in which the carbon monoxide in said reformed gas stream is at least partially reacted with additional steam in a further catalytic step to produce further hydrogen and carbon dioxide prior to said further cooling step, and resulting carbon dioxide contained in said gas stream is removed from the final cooled gas stream prior to said gas compression step.

References Cited in the file of this patent

UNITED STATES PATENTS

| | | |
|---|---|---|
| 1,904,592 | Young et al. | Apr. 18, 1933 |
| 2,383,715 | De Jahn | Aug. 28, 1945 |
| 2,493,454 | Hagy | Jan. 3, 1950 |
| 2,942,953 | Shields | June 28, 1960 |